US012441370B2

(12) United States Patent
Stent

(10) Patent No.: US 12,441,370 B2
(45) Date of Patent: Oct. 14, 2025

(54) DRIVER DAZZLE MITIGATION SYSTEMS AND METHODS

(71) Applicant: TOYOTA RESEARCH INSTITUTE, INC., Los Altos, CA (US)

(72) Inventor: Simon A. I. Stent, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 460 days.

(21) Appl. No.: 16/835,214

(22) Filed: Mar. 30, 2020

(65) Prior Publication Data

US 2021/0300428 A1    Sep. 30, 2021

(51) Int. Cl.
*B60W 60/00* (2020.01)
*B60W 10/04* (2006.01)
(Continued)

(52) U.S. Cl.
CPC ........ *B60W 60/0051* (2020.02); *B60W 10/04* (2013.01); *B60W 10/20* (2013.01); *B60W 40/08* (2013.01); *B60W 60/0016* (2020.02); *B60W 60/0059* (2020.02); *B60W 2420/403* (2013.01); *B60W 2540/229* (2020.02)

(58) Field of Classification Search
CPC ......... B60W 60/0051; B60W 60/0016; B60W 60/0059; B60W 40/08; B60W 10/20; B60W 10/04; B60W 2420/403; B60W 2540/229
USPC ........ 701/23, 48, 58, 60, 68; 340/7.58, 7.59, 340/901
See application file for complete search history.

(56) References Cited

U.S. PATENT DOCUMENTS 5,258,607 A * 11/1993 Agostini ................ A42B 3/046
  359/275
5,841,507 A * 11/1998 Barnes .................... G02C 7/104
(Continued)

FOREIGN PATENT DOCUMENTS

DE    102012205429       10/2013
DE    102013212011 A1 *  1/2015 ............. B60Q 1/143
WO    WO-2014195821 A1 * 12/2014 ............. G02C 11/10

OTHER PUBLICATIONS

Machine Translation of German Patent Application DE-102013212011-A1. (Year: 2015).*

*Primary Examiner* — Ramon A. Mercado
*Assistant Examiner* — Ellis B. Ramirez
(74) *Attorney, Agent, or Firm* — SHEPPARD, MULLIN, RICHTER & HAMPTON LLP; Daniel N. Yannuzzi

(57) ABSTRACT

Systems and methods for driver dazzle detection for a subject vehicle, may include: using a plurality of sensors to gather data regarding driver characteristics and light source characteristics in an environment of the subject vehicle; evaluating sensor data from the plurality of sensors received to determine at least one of a driver characteristic and a light source characteristic; determining a level of dazzling of a driver of the vehicle based on the determined at least one of a driver characteristic and a light source characteristic; and engaging remedial action based on the determined level of dazzle of the driver of the vehicle, wherein the remedial action comprises at least one of switching a control of the vehicle from a manual drive mode to an autonomous drive mode and engaging an ADAS feature if it is detected that the determine level of dazzling is above a dazzling threshold.

20 Claims, 5 Drawing Sheets

(51) Int. Cl.
*B60W 10/20* (2006.01)
*B60W 40/08* (2012.01)

(56) References Cited

U.S. PATENT DOCUMENTS

| | | | |
|---|---|---|---|
| 2008/0303915 A1* | 12/2008 | Omi | G06K 9/00255 348/222.1 |
| 2012/0212353 A1* | 8/2012 | Fung | B60W 30/12 340/905 |
| 2013/0147936 A1* | 6/2013 | Lee | G06K 9/00845 348/78 |
| 2014/0092332 A1* | 4/2014 | Price | B60R 1/001 349/16 |
| 2016/0187879 A1* | 6/2016 | Mere | B60W 50/082 701/23 |
| 2018/0089516 A1 | 3/2018 | Govindasamy | |
| 2018/0132340 A1* | 5/2018 | Correa | B60Q 1/085 |
| 2019/0005817 A1 | 1/2019 | Krunic | |
| 2019/0009792 A1* | 1/2019 | Soderlind | B60W 30/09 |
| 2019/0243362 A1* | 8/2019 | Hyuga | B60W 60/0059 |
| 2020/0180611 A1* | 6/2020 | Klingemann | B60W 50/14 |
| 2020/0298678 A1* | 9/2020 | Katsura | B60J 7/043 |

\* cited by examiner

DRIVER DAZZLE MITIGATION SYSTEMS AND METHODS

TECHNICAL FIELD

The present disclosure relates generally to driver dazzle mitigation, and in particular, some implementations may relate to enhanced techniques for detecting driver dazzle and mitigating the effects thereof.

DESCRIPTION OF RELATED ART

Autonomous vehicle technology is becoming more commonplace with the introduction of new vehicles each model year. While widespread adoption of fully autonomous vehicles is only now becoming visible on the horizon, autonomous vehicle technology is gaining increasing popularity for assisted driving and other semi-autonomous vehicle operation. Developers within organizations such as major original equipment manufacturers, tier 1 suppliers and startup companies, are racing to develop autonomous vehicle and advanced driver assistance systems (ADAS) technologies.

BRIEF SUMMARY OF THE DISCLOSURE

Various embodiments of the disclosed technology relate to mitigating the effects of driver dazzle through various remediation methodologies including, activating an autonomous or partially autonomous vehicle mode upon detection of a driver dazzle event, activating an assisted driving mode upon detection of a driver dazzle event, providing alerts or instructions to the driver upon detection of a driver dazzle event. Various embodiments of the disclosed technology also relate to techniques for detecting the occurrence and severity of a driver dazzle event.

Embodiments may be implemented to evaluate various driver characteristics as well as characteristics of the light source of the potential dazzle event to determine whether an actual dazzle event is occurring. The detection of an actual dazzle event can trigger remedial action used to help counter the adverse effects of the actual dazzle event. The remedial action can be tailored to the circumstances of the driver dazzle event and the severity of the event.

In some embodiments, a system for driver dazzle detection for a subject vehicle may include: a plurality of sensors to gather data regarding driver characteristics and light source characteristics in an environment of the subject vehicle; a processor coupled to receive captured images from the image sensor; and a non-transitory memory coupled to the processor to store instructions, which when executed by the processor, cause the processor to perform operations. These operations may include: evaluating sensor data from the plurality of sensors received at the processor to determine at least one of a driver characteristic and a light source characteristic; determining a level of dazzling of a driver of the vehicle based on the determined at least one of a driver characteristic and a light source characteristic; and engaging remedial action based on the determined level of dazzle of the driver of the vehicle, wherein the remedial action may include at least one of switching a control of the vehicle from a manual drive mode to an autonomous drive mode and engaging an ADAS feature if it is detected that the determine level of dazzling is above a dazzling threshold.

A method for driver dazzle detection for a subject vehicle may include: evaluating sensor data from a plurality of sensors to determine at least one of a driver characteristic and a light source characteristic; determining a level of dazzling of a driver of the vehicle based on the determined at least one of a driver characteristic and a light source characteristic; and engaging remedial action based on the determined level of dazzle of the driver of the vehicle, wherein the remedial action may include at least one of switching a control of the vehicle from a manual drive mode to an autonomous drive mode and engaging an ADAS feature if it is detected that the determine level of dazzling is above a dazzling threshold.

Switching a control of the vehicle from a manual drive mode to an autonomous drive mode may include switching the vehicle to a fully autonomous mode or a partially autonomous mode depending on the level of dazzle determined.

Engaging an ADAS feature may further include determining which of a plurality of ADAS features to engage based on the level of dazzle determined.

A light source characteristic may include at least one of a rate of change of intensity of the source of light causing the dazzle event, a magnitude of the change in intensity of the source of light causing the dazzle event, and a total intensity presented by the source of light causing the dazzle event at the operator's eyes. The systems and methods may further include evaluating the amount of ambient light present at the time of the potential dazzle event and the spectrum of the light causing the dazzle event.

The systems and methods may further include determining a type of remedial action to engage based on the determined level of dazzle of the driver of the vehicle.

The systems and methods may further include determining a level of remedial action to engage based on the determined level of dazzle of the driver of the vehicle.

Determining a level of dazzling may include calculating a weighted combination of at least two of a plurality of driver characteristics and light source characteristics. The systems and methods may further include determining weights for the weighted combination for individual drivers of the vehicle.

The systems and methods may further include determining based on sensor information whether the driver is wearing sunglasses and suspending driver dazzle determinations when the driver is wearing sunglasses.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
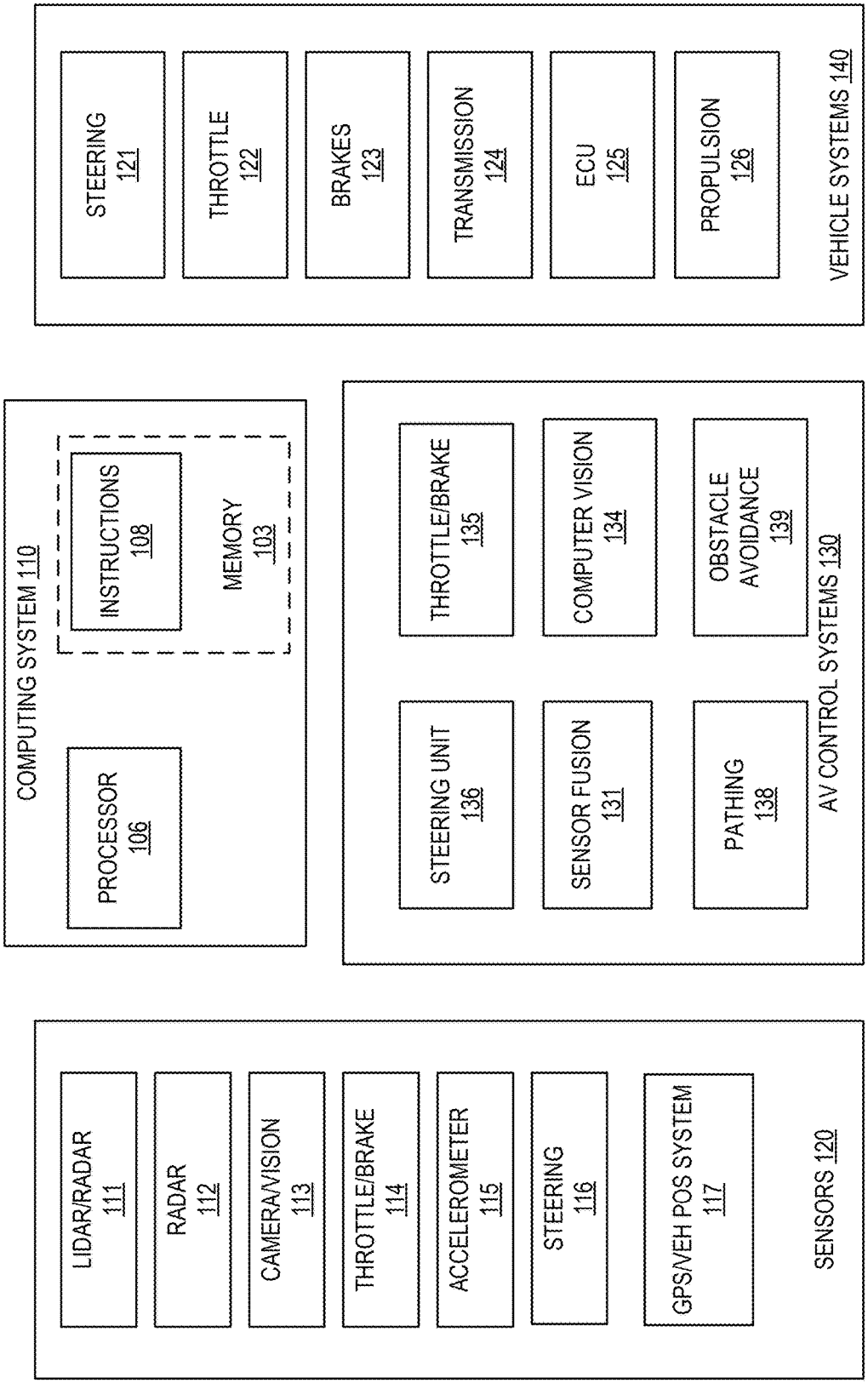
FIG. 1 illustrates an example autonomous or semi-autonomous vehicle with which embodiments of the disclosed technology may be implemented.

The figures are not exhaustive and do not limit the present disclosure to the precise form disclosed.

DETAILED DESCRIPTION

Various embodiments of the disclosed technology relate to mitigating the effects of driver dazzle through various remediation methodologies including, activating an autonomous or partially autonomous vehicle mode upon detection of a driver dazzle event, activating an assisted driving mode upon detection of a driver dazzle event, providing alerts or instructions to the driver upon detection of a driver dazzle event. Various embodiments of the disclosed technology also relate to techniques for detecting the occurrence and severity of a driver dazzle event.

Embodiments may be implemented to evaluate various driver characteristics upon the detection of a potential dazzle event. These characteristics may include, for example, the direction of the driver's gaze and the amount of pupil contraction experienced by the driver at the time of the potential dazzle event. For example, the vehicle operator is looking in the direction of the source of light causing the dazzle event, or if the operators pupils are detected to contract by a certain amount, the potential dazzle event can be verified.

Embodiments may also be implemented to evaluate light source characteristics including, for example, the rate of change of intensity of the source of light causing the dazzle event, the magnitude of the change in intensity of the source of light causing the dazzle event, or the total intensity presented by the source of light causing the dazzle event at the operator's eyes. The system can also evaluate the amount of ambient light present at the time of the potential dazzle event and the spectrum of the light causing the dazzle event.

A dazzle determination module can be included to one or more of the driver characteristics and the dazzle characteristics, whether alone or in various combinations, to determine whether a driver dazzle event is occurring. If a driver dazzle event is occurring, the system can determine remedial action to initiate to mitigate the effects of the driver dazzle event. Determination of the remedial action or the amount of remedial action can be made based on the severity of the dazzle event.

In various embodiments, the remedial action may include engaging and autonomous vehicle mode for the subject vehicle to take over partial or total control of the vehicle from the driver, engaging an appropriate ADAS system to provide driver assistance to support the driver during the driver dazzle event (including during lingering aftereffects of such event), and providing an alert, prompt or other information to the driver regarding the driver dazzle event. The alert, prompt or other information can be provided to assist the driver in light of the driver dazzle event.

The systems and methods disclosed herein may be implemented with any of a number of different autonomous or semi-autonomous vehicles and vehicle types. For example, the systems and methods disclosed herein may be used with cars, trucks, buses, construction vehicles and other on- and off-road vehicles. These can include vehicles for transportation of people/personnel, materials or other items. In addition, the technology disclosed herein may also extend to other vehicle types as well. An example Autonomous Vehicle (AV) in which embodiments of the disclosed technology may be implemented is illustrated in FIG. 1.

FIG. 1 illustrates an example autonomous or semi-autonomous vehicle with which embodiments of the disclosed technology may be implemented. In this example, vehicle 100 includes a computing system 110, sensors 120, AV control systems, 130 and vehicle systems 140. Vehicle 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle 100 can be partitioned in other ways. For example, various vehicle systems and subsystems can be combined in different ways to share functionality.

Sensors 120 may include a plurality of different sensors to gather data regarding vehicle 100, its operator, its operation and its surrounding environment. In this example, sensors 120 include lidar 111, radar 112, or other like the distance measurement sensors, image sensors 113, throttle and brake sensors 114, 3D accelerometers 115, steering sensors 116, and a GPS or other vehicle positioning system 117. Distance measuring sensors such as lidar 111, radar 112, IR sensors and other like sensors can be used to gather data to measure distances and closing rates to various external objects such as other vehicles, traffic signs, pedestrians, light poles and other objects. Image sensors 113 can include one or more cameras or other image sensors to capture images of the environment around the vehicle as well as internal to the vehicle. Information from image sensors 113 can be used to determine information about the environment surrounding the vehicle 100 including, for example, information regarding other objects surrounding vehicle 100. For example, image sensors 113 may be able to recognize landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 113 can be used in conjunction with other information such as map data or information from positioning system 117 to determine, refined or verify vehicle location.

Throttle and brake sensors 114 can be used to gather data regarding throttle and brake application by a human or autonomous operator. Accelerometer 115 may include a 3D accelerometer to measure roll, pitch and yaw of the vehicle. Accelerometer 115 may include any combination of accelerometers and gyroscopes for the vehicle or any of a number of systems or subsystems within the vehicle to sense position and orientation changes based on inertia.

Steering sensor 116 can be included to gather data regarding steering input for the vehicle by a human or autonomous operator, and vehicle positioning system 117 (e.g., GPS or other positioning system) can be used to gather position information about a current location of the vehicle as well as other positioning or navigation information. Although not illustrated, other sensors 120 may be included as well.

Although not illustrated, other sensors 120 may be provided as well. Various sensors 120 may be used to provide input to computing system 110 and other systems of vehicle 100 so that the systems have information useful to operate in an autonomous, semi-autonomous or manual mode.

AV control systems 130 may include a plurality of different systems/subsystems to control operation of vehicle 100. In this example, AV control systems 130 include steering unit 136, throttle and brake control unit 135, sensor fusion module 131, computer vision module 134, pathing module 138, and obstacle avoidance module 139. Sensor fusion module 131 can be included to evaluate data from a plurality of sensors, including sensors 120. Sensor fusion module 131 may use computing system 110 or its own computing system to execute algorithms to assess inputs from the various sensors.

Throttle and brake control unit 135 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g, disk, drum, etc.) or engage regenerative braking (e.g., such as in a hybrid or electric vehicle) to slow or stop the vehicle.

Steering unit 136 may include any of a number of different mechanisms to control or alter the heading of the vehicle. For example, steering unit 136 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 136.

Computer vision module 134 may be included to process image data (e.g., image data captured from image sensors 113, or other image data) to evaluate the environment within or surrounding the vehicle. For example, algorithms operating as part of computer vision module 134 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on.

Pathing module 138 may be included to compute a desired path for vehicle 100 based on input from various other sensors and systems. For example, pathing module 138 can use information from positioning system 117, sensor fusion module 131, computer vision module 134, obstacle avoidance module 139 (described below) and other systems to determine a safe path to navigate the vehicle along a segment of a desired route. Pathing module 138 may also be configured to dynamically update the vehicle path as realtime information is received from sensors 120 and other control systems 130.

Obstacle avoidance module 139 can be included to determine control inputs necessary to avoid obstacles detected by sensors 120 or AV control systems 130. Obstacle avoidance module 139 can work in conjunction with pathing module 138 to determine an appropriate path to avoid a detected obstacle.

Vehicle systems 140 may include a plurality of different systems/subsystems to control operation of vehicle 100. In this example, AV control systems 130 include steering system 121, throttle system 122, brakes 123, transmission went 24, electronic control unit (ECU) 125 and propulsion system 126. These vehicle systems 140 may be controlled by AV control systems 130 in autonomous, semi-autonomous or manual mode. For example, in autonomous or semi-autonomous mode, AV control systems 130, alone or in conjunction with other systems, can control vehicle systems 140 to operate the vehicle in a fully or semi-autonomous fashion. This may also include an assist mode in which the vehicle takes over partial control or activates ADAS controls to assist the driver with vehicle operation.

Computing system 110 in the illustrated example includes a processor 106, and memory 103. Some or all of the functions of vehicle 100 may be controlled by computing system 110. Processor 106 can include one or more GPUs, CPUs, microprocessors or any other suitable processing system. Processor 106 may include one or more single core or multicore processors. Processor 106 executes instructions 108 stored in a non-transitory computer readable medium, such as memory 103.

Memory 103 may contain instructions (e.g., program logic) executable by processor 106 to execute various functions of vehicle 100, including those of vehicle systems and subsystems. Memory 103 may contain additional instructions as well, including instructions to transmit data to, receive data from, interact with, and/or control one or more of the sensors 120, AV control systems, 130 and vehicle systems 140. In addition to the instructions, memory 103 may store data and other information used by the vehicle and its systems and subsystems for operation, including operation of vehicle 100 in the autonomous, semi-autonomous or manual modes.

Although one computing system 110 is illustrated in FIG. 1, in various embodiments multiple computing systems 110 can be included. Additionally, one or more systems and subsystems of vehicle 100 can include its own dedicated or shared computing system 110, or a variant thereof. Accordingly, although computing system 110 is illustrated as a discrete computing system, this is for ease of illustration only, and computing system 110 can be distributed among various vehicle systems or components.

Vehicle 100 may also include a wireless communication system (not illustrated) to communicate with other vehicles, infrastructure elements, cloud components and other external entities using any of a number of communication protocols including, for example, V2V, V2I and V2X protocols. Such a wireless communication system may allow vehicle 100 to receive information from other objects including, for example, map data, data regarding infrastructure elements, data regarding operation and intention of surrounding vehicles, and so on. A wireless communication system may also allow vehicle 100 to transmit information to other objects. In some applications, computing functions for various embodiments disclosed herein may be performed entirely on computing system 110, distributed among two or more computing systems 110 of vehicle 100, performed on a cloud-based platform, performed on an edge-based platform, or performed on a combination of the foregoing.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
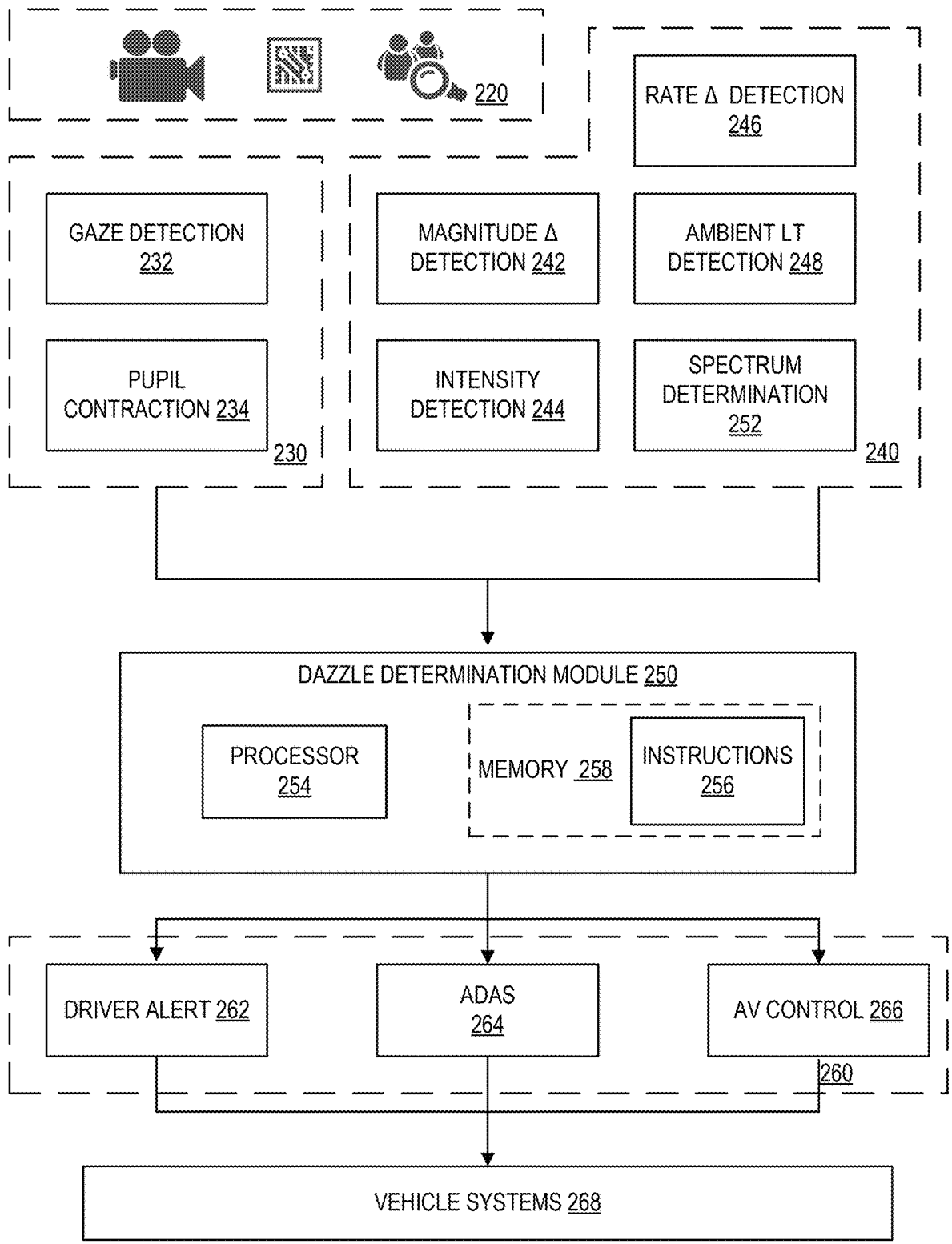
FIG. 2 illustrates an example system for driver dazzle mitigation in accordance with one embodiment.

FIG. 2 illustrates an example system for driver dazzle mitigation in accordance with one embodiment. In this example, information from various sensors can be gathered to detect the occurrence of conditions that can lead to a driver dazzle event, detect the occurrence of a driver dazzle event, and determine whether and to what extent remedial action needs to be taken in the event an actual driver dazzle event is detected. The example of FIG. 2 includes a plurality of sensors 220, driver characteristics detection modules 230 and light source characteristics determination modules 240, driver dazzle determination module 250, remediation modules 260 and vehicle systems 268.

Sensors can include any of a number of sensor devices to detect events that can indicate the occurrence and severity of the driver dazzle event. The sensors can include, for example, one or more of an image sensor or other camera, a light sensor, an occupant sensor, and so on. Sensors can include some level of processing to process the data gathered by the sensors or they can be configured to pass raw data onto another processing element. In this example, sensor data is passed to and received by driver characteristics detection modules 230 and light source characteristics determination modules 240. Driver characteristics detection modules 230 in this example include a gaze detection module 232 and a pupil contraction module 234.

Gaze detection module 232 may be implemented to evaluate the characteristics of the driver's eyes (e.g., as detected by one or more image sensors) to determine the direction of the driver's gaze. For example, the system can be configured to sense the orientation of the driver's head and the direction in which the driver's gaze is directed based on a determination of the location of the irises. Other sensors can be included to determine the direction of the source of light causing the potential driver dazzle event. Where the gaze of the driver is directed in the direction of the light source, a driver dazzle event is more likely to occur than if the driver is directing their gaze away from the direction of the light source.

Pupil contraction module 234 can be configured to determine the amount of contraction experienced by the driver's pupils over a period of time. Data from image sensors or other sensors can be used to measure pupil diameter and calculate a rate of contraction of pupil diameter to determine whether the driver is experiencing a rapid contraction in pupil size. A rapid contraction in pupil size may indicate the occurrence of a driver dazzle event. A contraction in pupil size in conjunction with the detection of light impinging upon the driver's face in the vicinity of their eyes may also indicate the occurrence of a driver dazzle event.

Other events that can be captured by image sensors as indicative of a dazzle event may include a sudden gaze aversion away from the road or source of light, squinting, covering the eyes, and so on. In further embodiments, information from image sensors may be used to detect whether or not the driver is wearing sunglasses. If the driver is wearing sunglasses, this information may be used to override the dazzle mitigation system. Accordingly, for periods when the driver is detected to be wearing sunglasses the dazzle mitigation system may be relieved of making other computations or analysis.

Light source characteristics determination modules in this example include a change of magnitude detection module 242, an intensity detection module 244, a rate of change detection module 246, and ambient light detection module 248 and a light spectrum determination module 252. Intensity detection module 244 can be configured to measure the intensity of the light potentially causing a driver dazzle event. An intensity of light higher than a threshold amount can indicate the occurrence of a driver dazzle event. Intensity can be measured in lumens (flux) candelas (intensity), lux (illuminance), or other units of measurement. Intensity can be measured, for example, based on the amount of light reflected from the driver's face in the vicinity of their eyes. Intensity may also be measured using the amount of light from the source of the potential dazzle event impinging upon a sensor.

Intensity information regarding the source can also be used by change of magnitude detection module 242 to determine the magnitude of changes in the intensity (whether measured as flux, intensity or illuminance) of the source light over time. Intensity information regarding the source can also be used by rate of change detection module 246 to determine how quickly the intensity of light from the source increases over time. A large change in magnitude of the intensity over a short period of time, for example, can indicate the occurrence of a driver dazzle event.

Sensor information can be used by light spectrum determination module 252 to determine the wavelength of the light from the light source. Information regarding the wavelength of the light from the light source can be useful to determine the severity of the impact of increased light from the light source. For example, light in the visible spectrum is generally more likely to cause a driver dazzle event then a similar intensity of light outside of the visible spectrum. As a further example, light of a wavelength in the part of the visible spectrum where the human eye is most sensitive is even more likely to cause a driver dazzle event. Typically, the human eye is most sensitive to light at a wavelength of 555 nm in daylight and 507 nm at night. Accordingly, light at or near these wavelengths at the respective times of day is more likely to cause a driver dazzle event, whereas light of similar intensity in the range of 400 nm to 475 nm, for example is less likely to cause a driver dazzle event.

Sensor information can be used by ambient light detection module 248 to detect the amount of ambient light present at the time of the potential driver dazzle event. Light from a light source such as headlights from another vehicle may have a lesser effect on the driver when the amount of ambient light is high and the driver is accustomed to light. An example circumstances when an approaching vehicle as its headlights on during daylight hours. Headlights from and oncoming vehicle during daylight hours tend to have a lesser effect on a driver then oncoming headlights at night time.

These various modules included with driver characteristics detection modules 230 and light source characteristics determination modules 240 can be implemented using dedicated or shared processing systems or other circuits including a processor module similar to the dazzle determination module 250 as described below. For example, in some embodiments the functions performed by some or all of these modules can be performed by dazzle determination module 250.

Dazzle determination module 250 can be configured to determine whether a driver dazzle event is occurring and the severity of the driver dazzle event. For example, dazzle determination module 250 can evaluate factors determined by driver characteristics detection modules 230 and light source characteristics determination modules 240 to determine the likelihood and severity of a driver dazzle event. For example one or more of the determined driver characteristics and light source characteristics can be evaluated alone or in various combinations to determine the likelihood and severity of a driver dazzle event.

As one example, dazzle determination module 250 can be configured to determine whether one or more of the characteristics measured by driver characteristics detection modules 230 and light source characteristics determination modules 240 exceeds a tolerance threshold, and if so, a driver dazzle event can be deemed to have occurred. For example, where dazzle determination module 250 determines that light from the source is in the visible spectrum (e.g., from light spectrum determination module 252), its intensity is above a determined intensity threshold (e.g. from intensity detection module 244) and it rose to that level of intensity in a short period of time (rate of change detection module 246), the system may determine that a driver dazzle event is occurring. As another example, where the system detects light from a light source (e.g. from intensity detection module 244) and detects a rapid pupil contraction of the driver's eyes (from pupil contraction detection module 234), the system may likewise determine that a driver dazzle event is occurring.

Various factors determined by one or more of driver characteristics detection modules 230 and light source characteristics determination modules 240 can also be used to gauge the severity of the driver dazzle event. For example, where it is determined that the driver's gaze is directed toward the light source and the light source is of high intensity, this may be deemed of greater severity in a circumstance where the drivers gaze is directed away from the light source even if the light sources at a similar intensity. Accordingly, one or more of the determination's such as direction of gaze, amount of pupil contraction, intensity of the light, the amount of change in intensity, the rate of change in intensity, the closeness of the wavelength of the light source to the wavelength of peak-eye sensitivity, and the intensity of the light relative to the ambient light intensity can be factored together to determine the severity of the driver dazzle event.

Dazzle determination module 250 includes a processor 254 and memory 258. Processor 254 can include one or more GPUs, CPUs, microprocessors or any other suitable processing system. Processor 254 may include one or more single core or multicore processors. Processor 254 executes instructions 256 stored in a non-transitory computer readable medium, such as memory 258.

Memory 258 may contain instructions (e.g., program logic) executable by processor 254 to execute various functions of vehicle 100, including those of vehicle systems and subsystems. Memory 258 may contain additional instructions as well, including instructions to transmit data to, receive data from, interact with, and/or control one or more of the sensors 120, AV control systems, 130 and vehicle systems 140. In addition to the instructions, memory 258 may store data and other information used by the vehicle and its systems and subsystems for operation, including operation of vehicle 100 in the autonomous, semi-autonomous or manual modes.

Although one dazzle determination module 250 is illustrated in FIG. 2, in various embodiments dazzle determination modules 250 can be included. These one or more dazzle determination modules 250 may also be used to implement one or more of the various modules of driver characteristics detection modules 230 and light source characteristics determination modules 240. In some embodiments, some or all of the functions of dazzle determination module 250 (including one or more of driver characteristics detection modules 230 and light source characteristics determination modules 240) may be implemented using a vehicle processing unit including, for example, an ECU or computing system 110.

Dazzle determination module 250 can be configured to initiate remedial action upon the detection of a driver dazzle event. Dazzle determination module 250 can further be configured to determine the type of remedial action and the amount of remedial action based on the severity of the driver dazzle event or based on other characteristics surrounding the driver dazzle event. Severity of the driver dazzle event may be determined with or without the use of thresholds in the data evaluation process.

To initiate remedial action, dazzle determination module 250 can be configured to send signals to activate or otherwise control one or more of remediation modules 260. In the illustrated example, remediation modules 260 include autonomous vehicle (AV) control module 266, advanced driver assistance systems (ADAS) control module 264 and driver alert module 262. In other embodiments, other remediation modules may be included.

Autonomous vehicle control module 266 can be controlled by dazzle determination module 250 to activate a determined level of autonomous vehicle control. For example, in some circumstances dazzle determination module 250 may make a determination to activate up to a level-5 (fully autonomous) level of autonomous vehicle control. In other circumstances, dazzle determination module 250 they make a determination to activate a lower level (e.g., level-1-level-4) of autonomous vehicle control. In some embodiments, custom levels of autonomous control can be blended with human driver control to provide driver assistance during the driver dazzle event.

Dazzle determination module 250 may make a determination to actuate autonomous vehicle control module 266 for remedial action. Dazzle determination module 250 can be configured to one of a plurality of different ADAS assistance systems available on a given vehicle depending on the circumstances surrounding the driver dazzle event. Different circumstances may warrant different types of assistance.

The level of control selected or the type of assistance selected for either autonomous vehicle control or ADAS driver assistance can depend in some embodiments on the severity of the driver dazzle event detected. The level of control or ADAS assistance selected can also depend on other circumstances relating to vehicle operation at the time of the driver dazzle event. These other circumstances can include factors such as, for example, vehicle operating parameters (e.g., speed, braking, wheelspin, roll/pitch/yaw, and so on), road conditions (e.g., narrow road, curvy road, slippery surface, and so on), traffic conditions (e.g., dense traffic, like traffic, nearby surrounding vehicles, and so on), driver conditions (e.g., driver alertness, driver skill level, driver profile information, and so on) and other information that may be useful to inform the operating conditions of the vehicle.

Autonomous vehicle control module 266 can be controlled by dazzle determination module 250 to activate a determined level of autonomous vehicle control. For example, in some circumstances, dazzle determination module 250 may activate driver alert module 262 to provide one or more alerts to the driver of the subject vehicle. These alerts may include, for example, audible, visual or tactile alerts to provide alerts, data or other information to the driver in response to the driver dazzle event. This information might include, for example, an alert to the driver that a driver dazzle event is occurring or about to occur so that the driver can take remedial action such as, for example, averting their gaze or looking away from the source of dazzle, slowing the vehicle, driving with an increased level of focus, and so on. As another example of the information might include training information inform the driver of steps they can take for safer vehicle operation upon the occurrence of a driver dazzle event. As yet another example, the information might instruct the driver to manually activate a level of autonomous operation or one or more ADAS features.

Remediation modules 260 may be configured to send control signals to control one or more vehicle systems 268. Vehicle systems may include, for example, vehicle systems 140 and AV control systems 130 (which may themselves control vehicle systems 140). Accordingly, remediation modules 260 may be configured to cause the vehicle to behave in accordance with the chosen remedial action.

Figure 3:
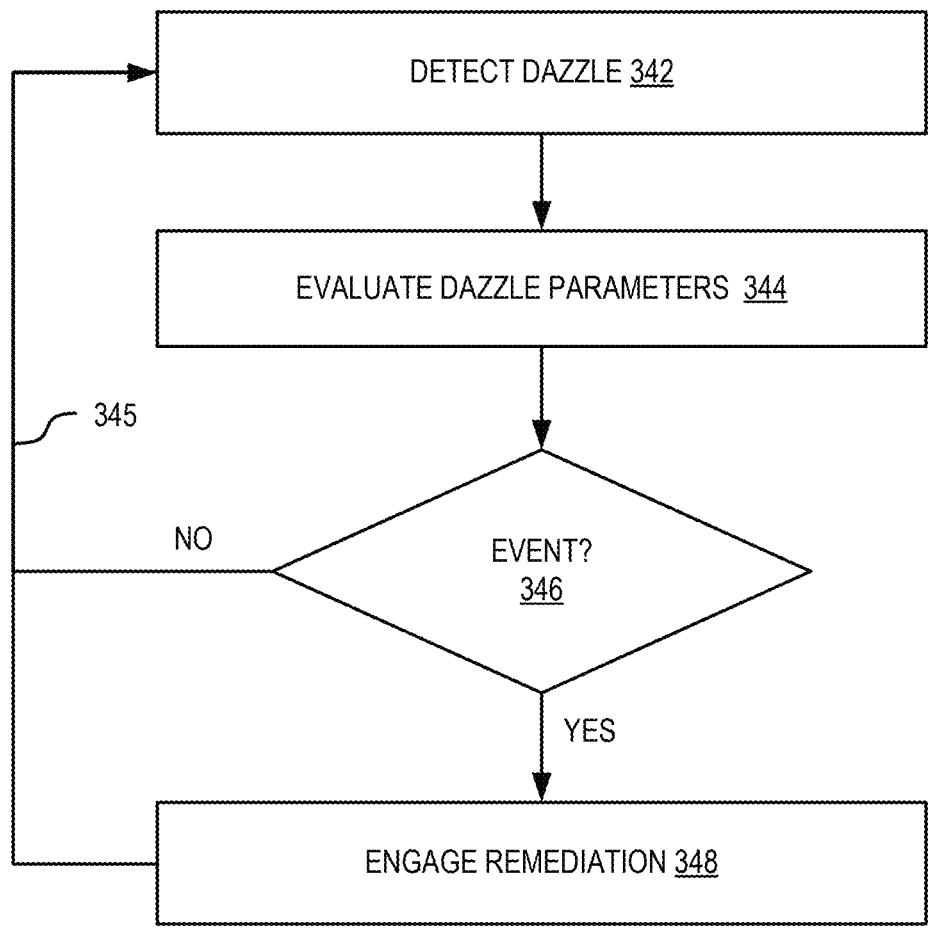
FIG. 3 illustrates an example process for driver dazzle detection and mediation in accordance with one embodiment.

FIG. 3 illustrates an example process for driver dazzle detection and mediation in accordance with one embodiment. With reference now to FIG. 3, at operation 342 a driver dazzle detection system detects the occurrence of a possible driver dazzle event. For example, vehicle sensors (e.g., sensors 220) may detect information that can be used to determine driver characteristics and light source characteristics. The sensors may include sensors such as still or video cameras or other image sensors, other light detection sensors, vehicle occupant sensors, and so on.

At operation 344, the system evaluates driver characteristics and light source characteristics to determine whether a driver dazzle event is occurring, or is about to occur. As discussed above with reference to FIG. 2, in some implementations driver characteristics detection modules 230 and light source characteristics determination modules 240 can be used to determine driver characteristics (e.g., gaze and pupil constriction, and so on) and light source characteristics (e.g., intensity, rate of change of intensity, magnitude of change of intensity, spectrum of the light source, and so on) and these determine characteristics can be used to detect the occurrence of a driver dazzle event. This can be accomplished, for example, using a driver dazzle determination module 250.

In the event a driver dazzle event is detected (346) at operation 348 the system can engage remediation. As discussed above, remediation may include, for example, one or more of engaging partial or full autonomous vehicle operation, suggesting or engaging one or more ADAS features to assist the driver, and alerting the driver with alerts, prompts or other information to assist with driver dazzle events. If a driver dazzle event is not detected or when a current driver dazzle event concludes, the system may continue to evaluate sensor data to detect dazzle as illustrated by flowline 345.

Figure 4:
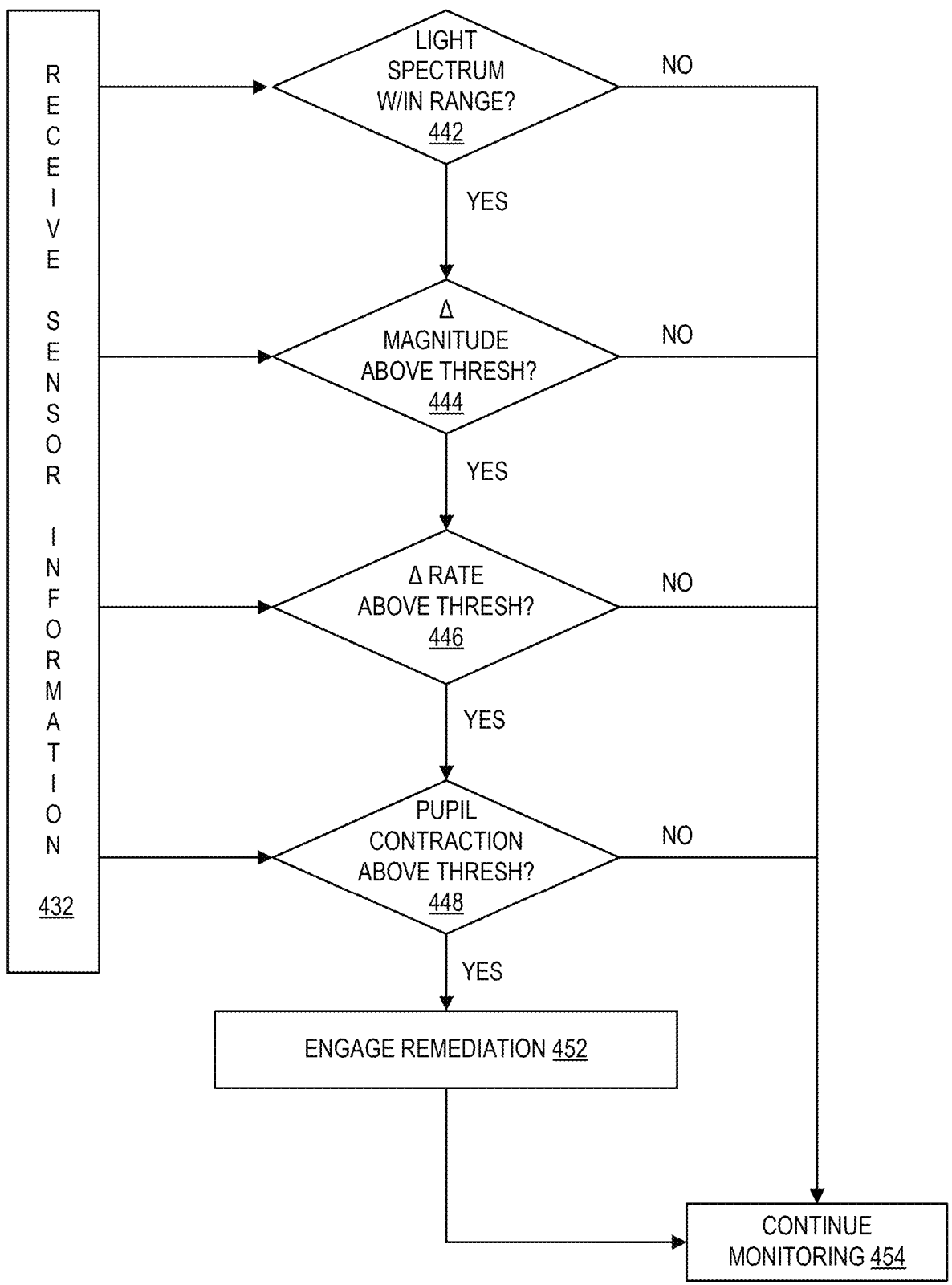
FIG. 4 illustrates an example process for driver dazzle detection and remediation in accordance with one embodiment.

FIG. 4 illustrates an example process for driver dazzle detection and remediation in accordance with one embodiment. With reference now to FIG. 4 at operation 432 the system receive sensor information from one or more of a plurality of sensors. As noted above, the sensors may include, for example, sensors such as still or video cameras or other image sensors, other light detection sensors, vehicle occupant sensors, and any other sensors that may be useful for providing information to detect a driver dazzle event.

In this example, the system evaluates four separate parameters to detect the existence of a driver dazzle event. Further in this example, each parameter must be present in order for a driver dazzle event to be detected and remedial action engaged. In other examples, other parameters may be evaluated in addition to or aside from those illustrated in the example of FIG. 4, and different quantities of parameters can be evaluated in order to determine whether a driver dazzle event occurs.

At operation 442, if the light from the light source causing a potential driver dazzle event is not within a range of the spectrum identified as being sensitive to the human eye, the process in this example determines that a driver dazzle event does not occur in the system continues monitoring sensor data at operation 454. The range of the spectrum identified can include a broad or narrow range of the spectrum within the visible light spectrum. For example, in some embodiments, the range can be from 500 nm-600 nm. In other embodiments, the range can be from 510 nm-560 nm, 550 nm-560 nm. In further embodiments, broader ranges can be used. These ranges might include for example, 380 nm-700 nm, 400 nm-675 nm, 425 nm-650 nm, 450 nm-625 nm, and other ranges. Although this example illustrates a binary decision process (i.e., it is within the range or outside the range), other processes can evaluate the light to determine where on the visible light spectrum light from the light source falls to determine the severity of the event. The severity may be used as a factor for determining the level or type of remedial action taken.

Although this example illustrates evaluating each of the parameters individually to determine whether a driver dazzle event occurs, other embodiments can utilize other techniques. For example, in some implementations the system can take a weighted combination of parameters and combine them in various ways to determine detection of a driver dazzle event. For example, the parameters may be normalized and the system can calculate a weighted average of parameter results, or a total score of combined parameter results to determine whether the incoming light rises to the level of a driver dazzle event and to detect the severity of the event.

A variation in reaction or sensitivity to dazzle among individual drivers may be significant. Therefore, in some embodiments the combination of factors or the thresholds used to detect a driver dazzle event may be different depending on the driver. An optimal weighting and threshold tailored to drivers can be determined using a learned model (e.g. linear regression, SVM or neural network), fitted/tuned to each driver through a feedback loop (e.g. vehicle warns driver of dazzle event detected and offers mitigation, driver responds to confirm or reject the warning). Accordingly the system can be tuned to be more aggressive or less aggressive depending on individual driver sensitivities.

A further contribution may be through the use of driving saliency and glare maps. A driving saliency model can be implemented to receive as input one or more of: (1) high dynamic range video of the forward road scene; (2) ego vehicle trajectory information; (3) route planning information; and (4) map information that includes known salient objects. This information can be used to determine, as output, a heatmap of the forward road scene identifying portions that are salient (i.e. important for the driver to look at) for the current driving scene and task. For example, if the ego vehicle is about to turn left across traffic at a traffic light, such a saliency module can determine that certain parts of the scene are critically salient (e.g. the traffic light, any lanes of potentially oncoming traffic). The module could further use the sensor information to predict the parts of the critically salient road scene which, if stared at, could cause driver dazzle (e.g. due to high contrast around those areas, such as a traffic light back-lit by the sun, or a straight wet road with a sun at the vanishing point, both of which are common sources of glare). This could be achieved by computing intensity differences in the image or through supervised learning to detect glare-inducing contrast. Given this driving saliency model, the glare detection system could operate without dependency on a gaze estimation, on the basis that a driver must attend to those salient areas of the scene despite the dazzle in order to safely operate the vehicle. Further embodiments may determine that because the driver is therefore likely to be at high risk of being dazzled additional safety measures should be put into place such as, for example, activating an ADAS system, providing driver alerts, increasing an amount of autonomous vehicle control, placing the vehicle in full autonomous mode, and so on.

Figure 5:
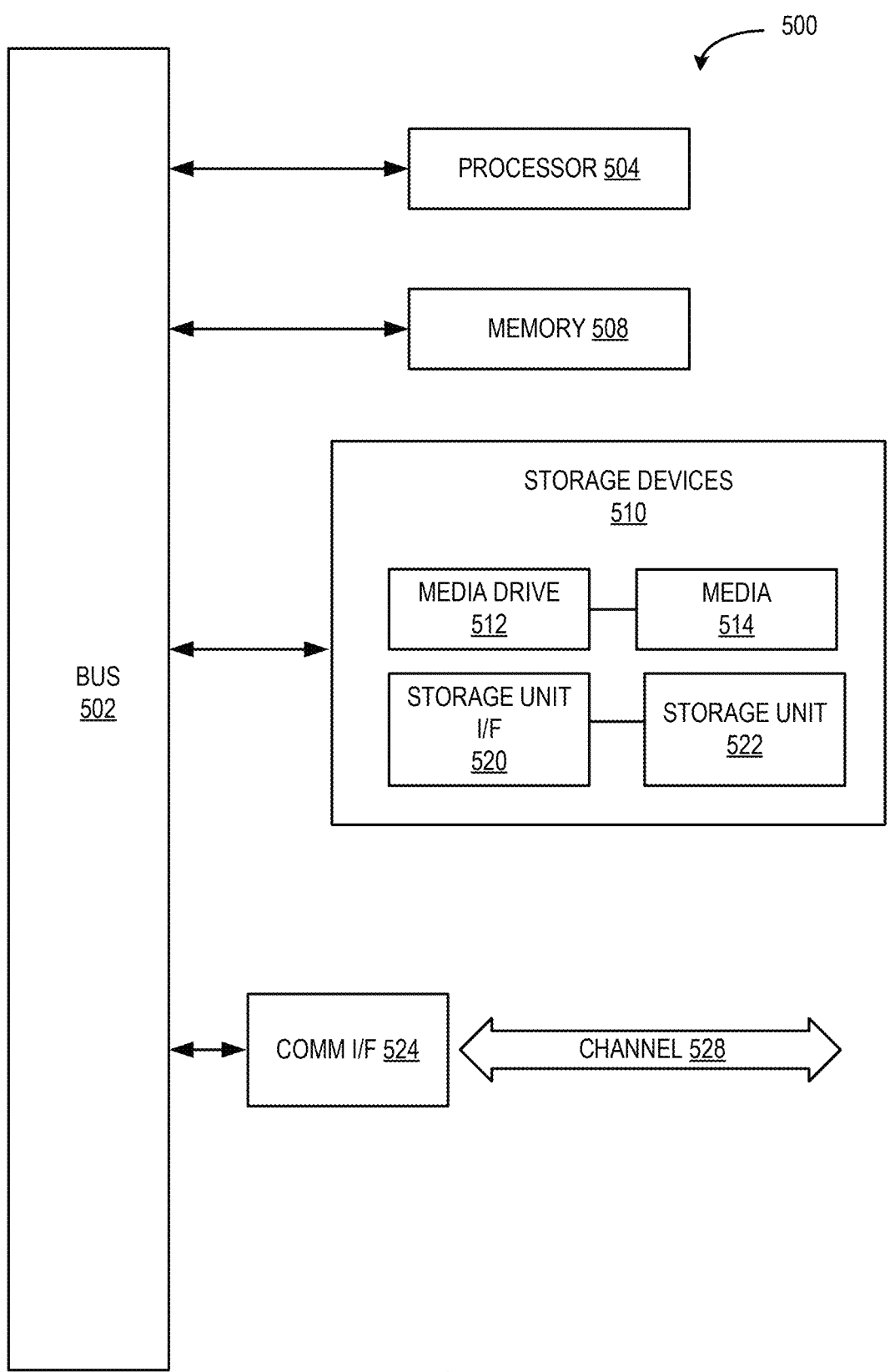
FIG. 5 is an example computing component that may be used to implement various features of embodiments described in the present disclosure.

As used herein, the term module may be used describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. Various components described herein may be implemented as discrete module or described functions and features can be shared in part or in total among one or more modules. In other words, as would be apparent to one of ordinary skill in the art after reading this description, the various features and functionality described herein may be implemented in any given application. They can be implemented in one or more separate or shared modules in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where modules are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for driver dazzle detection for a vehicle, comprising:
   a plurality of sensors to gather data regarding driver characteristics and light source characteristics in an environment of the vehicle;
   one or more processors coupled to receive data from the plurality of sensors; and
   a non-transitory memory coupled to the one or more processors to store instructions, which when executed by at least one of the one or more processors, cause the one or more processors to perform operations, the operations comprising:
      evaluating sensor data from the plurality of sensors received at the one or more processors to determine both a driver characteristic and a light source characteristic, wherein the light source characteristic comprises the brightness of light causing a dazzle event;
      evaluating an amount of ambient light present at the dazzle event and the spectrum of the light causing the dazzle event;
      determining a level of dazzling of a driver of the vehicle based on the determined driver characteristic, the light source characteristic, the amount of ambient light present at the dazzle event, and the spectrum of the light causing the dazzle event; and
      engaging remedial action based on the determined level of dazzle of the driver of the vehicle, wherein the remedial action comprises switching a control of the vehicle from a manual drive mode to a fully autonomous drive mode when it is detected that the determined level of dazzling is above a determined dazzling threshold.

2. The system of claim 1, wherein switching a control of the vehicle from a manual drive mode to an autonomous drive mode comprises switching the vehicle to a fully autonomous mode based on the level of dazzle determined.

3. The system of claim 1, wherein the light source characteristic comprises at least one of a rate of change of intensity of the source of light causing the dazzle event, a magnitude of the change in intensity of the source of light causing the dazzle event, and a total intensity presented by the source of light causing the dazzle event at an operator's eyes.

4. The system of claim 1, further comprising determining a type of remedial action to engage based on the determined level of dazzle of the driver of the vehicle.

5. The system of claim 1, further comprising determining a level of remedial action to engage based on the determined level of dazzle of the driver of the vehicle.

6. The system of claim 1, wherein determining a level of dazzling comprises calculating a weighted combination of at least two of a plurality of driver characteristics, light source characteristics, ambient light present at the dazzle event, and the spectrum of the light causing the dazzle event.

7. The system of claim 6, further comprising determining weights for the weighted combination for individual drivers of the vehicle.

8. The system of claim 1, further comprising determining based on sensor information whether the driver is wearing sunglasses and suspending driver dazzle determinations when the driver is wearing sunglasses.

9. A method for driver dazzle detection for a vehicle, comprising:
   evaluating sensor data from a plurality of sensors to determine both a driver characteristic and a light source characteristic, wherein the light source characteristic comprises a brightness of light causing a dazzle event;
   evaluating an amount of light present at the dazzle event and a spectrum of the light causing the dazzle event;
   determining a level of dazzling of a driver of the vehicle based on the determined driver characteristic, the light source characteristic, the amount of light present at the dazzle event, and the spectrum of the light causing the dazzle event; and
   engaging remedial action based on the determined level of dazzle of the driver of the vehicle, wherein the remedial action comprises switching a control of the vehicle from a manual drive mode to a fully autonomous drive mode when it is detected that the determined level of dazzling is above a determined dazzling threshold.

10. The method of claim 9, wherein switching a control of the vehicle from a manual drive mode to an autonomous drive mode comprises switching the vehicle to a fully autonomous mode based on the level of dazzle determined.

11. The method of claim 9, wherein the light source characteristic comprises at least one of a rate of change of intensity of the source of light causing the dazzle event, a magnitude of the change in intensity of the source of light causing the dazzle event, and a total intensity presented by the source of light causing the dazzle event at an operator's eyes.

12. The method of claim 9, further comprising determining a type of remedial action to engage based on the determined level of dazzle of the driver of the vehicle.

13. The method of claim 9, further comprising determining a level of remedial action to engage based on the determined level of dazzle of the driver of the vehicle.

14. The method of claim 9, wherein determining a level of dazzling comprises calculating a weighted combination of at least two of a plurality of driver characteristics, light source characteristics, ambient light present at the dazzle event, and the spectrum of the light causing the dazzle event.

15. The method of claim 14, further comprising determining weights for the weighted combination for individual drivers of the vehicle.

16. The method of claim 9, further comprising determining based on sensor information whether the driver is wearing sunglasses and suspending driver dazzle determinations when the driver is wearing sunglasses.

17. The system of claim 1, wherein engaging remedial action further comprises providing a visual or auditory alert to a driver prior to switching the control of the vehicle from the manual drive mode to the fully autonomous drive mode.

18. The method of claim 9, wherein engaging remedial action further comprises providing a visual or auditory alert to a driver prior to switching the control of the vehicle from the manual drive mode to the fully autonomous drive mode.

19. The system of claim 1, further comprising storing information representative of detected dazzle events and corresponding remedial actions in the non-transitory memory.

20. The method of claim 9, further comprising storing information representative of detected dazzle events and corresponding remedial actions in a non-transitory memory.

* * * * *